US010186386B2

(12) United States Patent
Yokomizo

(10) Patent No.: US 10,186,386 B2
(45) Date of Patent: Jan. 22, 2019

(54) SOLID ION CAPACITOR

(71) Applicants: Murata Manufacturing Co., Ltd., Nagaokakyo-shi, Kyoto-fu (JP); ENERGY STORAGE MATERIALS LLC, Fujisawa-shi, Kanagawa (JP)

(72) Inventor: Satoshi Yokomizo, Nagaokakyo (JP)

(73) Assignees: MURATA MANUFACTURING CO., LTD., Nagaokakyo-Shi, Kyoto-Fu (JP); ENERGY STORAGE MATERIALS LLC., Fujisawa-Shi, Kanagwa (JP)

( * ) Notice: Subject to any disclaimer, the term of this patent is extended or adjusted under 35 U.S.C. 154(b) by 48 days.

(21) Appl. No.: 15/001,421

(22) Filed: Jan. 20, 2016

(65) Prior Publication Data

US 2016/0141115 A1   May 19, 2016

Related U.S. Application Data

(63) Continuation of application No. PCT/JP2014/068217, filed on Jul. 8, 2014.

(30) Foreign Application Priority Data

Jul. 23, 2013  (JP) .................................. 2013-152625

(51) Int. Cl.
 *H01G 11/46* (2013.01)
 *H01G 11/56* (2013.01)
 (Continued)

(52) U.S. Cl.
 CPC ............. *H01G 11/56* (2013.01); *H01G 11/46* (2013.01); *Y02E 60/13* (2013.01); *Y02T 10/7022* (2013.01)

(58) Field of Classification Search
 CPC ........ H01G 11/46; H01G 11/56; H01G 9/025; H01G 9/15; H01G 2009/0014; H01G 9/0036
 (Continued)

(56) References Cited

U.S. PATENT DOCUMENTS 4,810,599 A * 3/1989 Kondo .................. G02F 1/1525
                                              361/501
4,977,007 A * 12/1990 Kondo .................. G02F 1/1525
                                              264/104
(Continued)

FOREIGN PATENT DOCUMENTS

CN        1410469 A       4/2003
CN      101388261 A       3/2009
(Continued)

OTHER PUBLICATIONS

International Search Report issued for PCT/JP2014/068217, dated Oct. 21, 2014.
(Continued)

*Primary Examiner* — Eric Thomas
*Assistant Examiner* — Arun Ramaswamy
(74) *Attorney, Agent, or Firm* — Arent Fox LLP

(57) ABSTRACT

A positive electrode and a negative electrode are formed on both main surfaces of a solid electrolyte. Preferably, the solid electrolyte is a thin film body with a thickness of less than or equal to 200 μm, and contains an ion conductive compound such as Li ions. The positive electrode and the negative electrode contain an ion conductive substance, for example $Li_2O$, which contains an ion conductive element such as Li, in a range of less than 50 vol % (not including 0 vol %), preferably 1 to 35 vol %.

7 Claims, 4 Drawing Sheets

(51) Int. Cl.
*H01G 9/025* (2006.01)
*H01G 9/15* (2006.01)
*H01G 9/00* (2006.01)

(58) Field of Classification Search
USPC .................................. 361/525, 523, 526, 527
See application file for complete search history.

(56) References Cited

U.S. PATENT DOCUMENTS

| | | |
|---|---|---|
| 6,051,343 A | 4/2000 | Suzuki et al. |
| 2007/0231704 A1 | 10/2007 | Inda |
| 2008/0117563 A1 | 5/2008 | Nagata et al. |

FOREIGN PATENT DOCUMENTS

| | | |
|---|---|---|
| JP | H10-154415 A | 6/1998 |
| JP | 2008-130844 A | 6/2008 |
| JP | 2012-015119 A | 1/2012 |
| JP | 2013-191769 A | 9/2013 |

OTHER PUBLICATIONS

Written Opinion of the International Searching Authority issued for PCT/JP2014/068217, dated Oct. 21, 2014.

\* cited by examiner

SOLID ION CAPACITOR

CROSS REFERENCE TO RELATED APPLICATIONS

The present application is a continuation of International application No. PCT/JP2014/068217, filed Jul. 8, 2014, which claims priority to Japanese Patent Application No. 2013-152625, filed Jul. 23, 2013, the entire contents of each of which are incorporated herein by reference.

FIELD OF THE INVENTION

The present invention relates to a solid ion capacitor, and more specifically to a solid ion capacitor which stores electric power using a solid electrolyte.

BACKGROUND OF THE INVENTION

As various electronic apparatuses such as mobile phones, notebook personal computers, and digital cameras become widespread, research and development of various power storage devices as cordless power sources for these electronic apparatuses have been actively performed. Of these power storage devices, an electric double layer capacitor is widely used for applications such as a backup power source for a personal computer memory, an auxiliary power source for a hybrid car, and the like, because it can be charged and discharged at a high speed, and its performance is less deteriorated even when it is repeatedly charged and discharged.

The electric double layer capacitor utilizes the fact that an ultra-thin electric double layer is formed between a positive electrode or a negative electrode and an electrolyte when a voltage is applied. During charging, the electric double layers are formed to store charges, and by discharging, charged particles return to the state before charging. Thus, the electric double layer capacitor does not utilize a chemical reaction. Accordingly, even when the electric double layer capacitor is repeatedly charged and discharged, neither heat generation nor deterioration occurs, and it can be charged and discharged quickly and highly efficiently. Therefore, it is believed that good cycle characteristics can be achieved.

PTD 1 proposes an all-solid electric double layer capacitor including a solid electrolyte and power collectors, wherein the solid electrolyte is an inorganic solid electrolyte.

In PTD 1, the solid electrolyte made of an inorganic compound is used to avoid occurrence of liquid leakage, because using a liquid electrolyte (electrolytic solution) may lead to deterioration due to liquid leakage.

Specifically, in PTD 1, a Li ion conductive compound having a NASICON-type crystal structure represented by $Li_{1.3}Al_{0.3}Ti_{1.7}(PO_4)_3$ is used, and the solid electrolyte mainly composed of the Li ion conductive compound is fabricated, with a diameter of 14.5 mm and a thickness of 0.97 mm. Then, electrodes made of Au are formed on both surfaces of the solid electrolyte to obtain the all-solid electric double layer capacitor having an electrostatic capacitance of 20 µF.

PTD 1: Japanese Patent Laying-Open No. 2008-130844 (claim 1, paragraphs [0050] to [0051], Table 1, and the like)

SUMMARY OF THE INVENTION

In a Li ion conductive compound having the NASICON-type crystal structure as in Patent Document 1, when a voltage is applied between a positive electrode and a negative electrode during charging, negative ions are present in a crystal lattice and do not move, and only positive ions move. Thus, unlike an electric double layer capacitor, a region to which an electric field is applied (hereinafter referred to as an "electric field applied region") is not shielded, and thereby an increase in the electric field applied region is expected.

Specifically, in a conventional electric double layer capacitor using a liquid electrolyte, at a portion other than ultra-thin electric double layers, the liquid electrolyte acts as a mere conductor, positive ions are attracted to negative ions in the vicinity of a positive electrode, and negative ions are attracted to positive ions in the vicinity of a negative electrode. Thus, the electric field applied region is limited to a region in the vicinity of each of the positive electrode and the negative electrode, and is shielded so as not to penetrate into the liquid electrolyte. Accordingly, it is difficult to increase the electric field applied region.

In contrast, in Patent Document 1, as described above, when a voltage is applied, negative ions are present in a crystal lattice and do not move, and only positive ions move. Accordingly, the electric field applied region is not shielded, and thereby an increase in the electric field applied region can be expected. In addition, since polarization is increased by charges moved by the electric field, it is believed that charges stored at the positive electrode and the negative electrode are increased, and can increase the electrostatic capacitance per volume.

However, in Patent Document 1, the solid electrolyte has a large thickness of 0.97 mm. Thus, it is not possible to increase the electric field applied region per volume in the solid electrolyte, and the state where the electric double layers are formed at interfaces between the solid electrolyte and both of the positive electrode and the negative electrode is maintained. Accordingly, the voltage applied during charging is loaded on the electric double layers only, and it is difficult to obtain a desired large electrostatic capacitance.

Therefore, it is thought to be only necessary to form the solid electrolyte as a thin film in order to obtain a large electrostatic capacitance. However, the inventor of the present invention has found as a result of studies that, even when the solid electrolyte is formed as a thin film, electrostatic capacitance is significantly reduced when charging and discharging are repeated, and thus it is not possible to ensure good cycle characteristics.

The present invention has been made in view of the aforementioned circumstances, and one object of the present invention is to provide a solid ion capacitor which is small-sized, can obtain a large electrostatic capacitance, and has good cycle characteristics, by using a thin film solid electrolyte.

The inventor of the present invention formed electrodes on both main surfaces of a solid electrolyte formed as a thin film, and conducted diligent studies. As a result, the inventor has obtained a finding that deterioration of cycle characteristics can be suppressed while ensuring a large electrostatic capacitance, by containing a substance containing a predetermined amount of ion conductive element in the electrodes.

The present invention has been made based on such a finding. A solid ion capacitor in accordance with the present invention is a solid ion capacitor having electrodes formed on both main surfaces of a solid electrolyte, wherein the solid electrolyte is made of a thin film body, and contains an ion conductive compound, and the electrodes contain a substance containing an ion conductive element, and a volume content of the substance containing the ion conductive element in the electrodes is less than 50 vol % (not including 0 vol %).

Thereby, an electric field is applied to the entire solid electrolyte, and a charge in the vicinity of an electrode can move to the vicinity of an electrode on the opposite side. Thus, extremely large polarization occurs, and charges stored at a positive electrode and a negative electrode are increased and can significantly increase electrostatic capacitance. In addition, since the substance containing the ion conductive element in a predetermined amount described above is contained in the electrodes, an unintended chemical reaction at interfaces between the electrodes and the solid electrolyte can be suppressed even when an ion conductive element in the ion conductive compound moves toward the electrodes during charging and discharging. Thereby, deterioration of cycle characteristics can be suppressed.

Preferably, in the solid ion capacitor of the present invention, the volume content is 1 to 35 vol %.

Preferably, in the solid ion capacitor of the present invention, the ion conductive element contained in the substance containing the ion conductive element is identical to an ion conductive element contained in the ion conductive compound, and the ion conductive element is an element contained in the ion conductive compound.

Preferably, in the solid ion capacitor of the present invention, the ion conductive element is Li.

Preferably, in the solid ion capacitor of the present invention, the ion conductive compound contains a NASICON-type crystal phase, and contains at least Li, Al, P, and O.

Thereby, only Li ions can be moved with O ions being arranged in a crystal lattice, and the electric field can be increased efficiently. Accordingly, a significant increase in electrostatic capacitance can be achieved effectively.

Preferably, in the solid ion capacitor of the present invention, the ion conductive compound contains a glass component.

In this case, the solid electrolyte made of a glass ceramic containing a glass component also exhibits good stability to moisture, and thus a solid ion capacitor excellent in moisture absorption resistance can be implemented.

Preferably, in the solid ion capacitor of the present invention, the electrodes are formed of a non-valve function material which does not have a valve function.

Thereby, ion conductivity can be ensured without forming an insulating layer at the interface between the solid electrolyte and each electrode, and desired large charges can be stored at the electrodes.

Preferably, in the solid ion capacitor of the present invention, the non-valve function material is a noble metal material, a transition metal material, an oxide material, a semiconductor material, or a material combining these materials.

Preferably, in the solid ion capacitor of the present invention, the non-valve function material includes at least one selected from Pd, Pt, and Cu.

The solid ion capacitor of the present invention is a solid ion capacitor having electrodes formed on both main surfaces of a solid electrolyte, wherein the solid electrolyte is made of a thin film body, and contains an ion conductive compound, and the electrodes contain a substance containing an ion conductive element, and a volume content of the substance containing the ion conductive element in the electrodes is less than 50 vol % (not including 0 vol %), preferably 1 to 35 vol %. Accordingly, an electric field is applied to the entire solid electrolyte, and a charge in the vicinity of an electrode can move to the vicinity of an electrode on the opposite side. Thus, extremely large polarization occurs, and charges stored at a positive electrode and a negative electrode are increased and can significantly increase electrostatic capacitance. In addition, since the substance containing the ion conductive element in a predetermined amount described above is contained in the electrodes, the ion conductive element in the electrodes suppresses causing of an unintended chemical reaction at interfaces with the solid electrolyte, even when an ion conductive element in the ion conductive compound moves toward the electrodes during charging and discharging. Thereby, a solid ion capacitor having good cycle characteristics in which a reduction in electrostatic capacitance is small even when it is repeatedly charged and discharged can be obtained.

DETAILED DESCRIPTION OF THE PREFERRED EMBODIMENTS

Next, an embodiment of the present invention will be described in detail.

Figure 1:
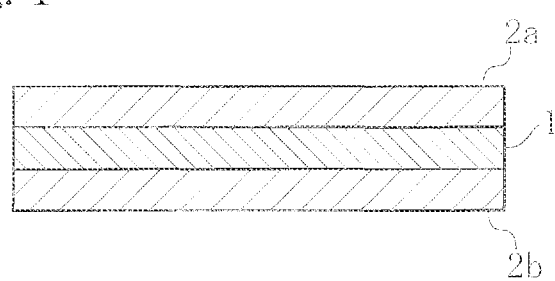
FIG. 1 is a cross sectional view schematically showing one embodiment of a solid ion capacitor in accordance with the present invention.

FIG. 1 is a cross sectional view schematically showing one embodiment of a solid ion capacitor in accordance with the present invention. The solid ion capacitor has a positive electrode 2a and a negative electrode 2b (electrodes) formed on both main surfaces of a solid electrolyte 1.

Solid electrolyte 1 is made of a thin film body, and contains an ion conductive compound. Further, positive electrode 2a and negative electrode 2b contain a substance containing an ion conductive element (hereinafter referred to as a "specific element-containing substance"), and each volume content of the specific element-containing substance in positive electrode 2a and negative electrode 2b is less than 50 vol % (not including 0 vol %).

Thus, by forming solid electrolyte 1 as a thin film body, it is possible to obtain a large electrostatic capacitance, and by containing the specific element-containing substance in a predetermined amount described above in positive electrode 2a and negative electrode 2b, it is possible to obtain a solid ion capacitor having good cycle characteristics in which a reduction in electrostatic capacitance is suppressed even when it is repeatedly charged and discharged.

Specifically, in a conventional electric double layer capacitor, a voltage is applied only to portions forming electric double layers, and charges are stored therein. Since electrostatic capacitance does not depend on the thickness of an electrolyte, it is necessary to increase an electrode area in order to increase the electrostatic capacitance. However, there is a limit on increasing the electrode area, and thus the electrostatic capacitance that can be obtained is only about 25 $\mu F/cm^2$, when converted in terms of specific capacity.

In contrast, in the solid ion capacitor of the present invention, an electric field applied region in solid electrolyte 1 can be increased by reducing the thickness of solid electrolyte 1. Thereby, electrostatic capacitance can be significantly increased without increasing an electrode area.

Figure 2A:
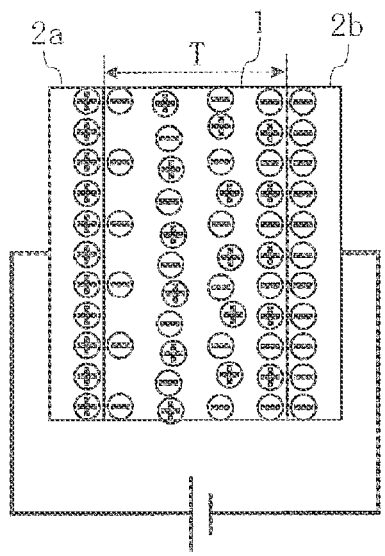
FIGS. 2(a) to 2(c) are views showing an operation principle of the solid ion capacitor.
Figure 2B:
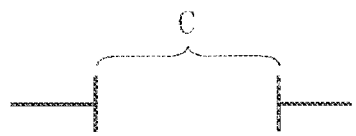
Figure 2C:
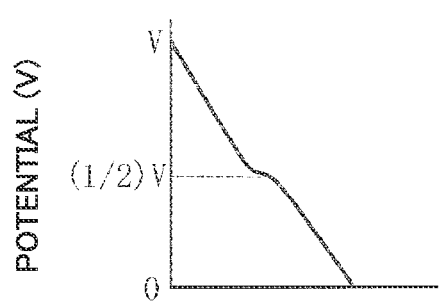

FIGS. 2(a) to 2(c) are views illustrating an operation principle of the solid ion capacitor, in which FIG. 2(a) shows a view schematically showing the solid ion capacitor, FIG. 2(b) shows an equivalent circuit of FIG. 2(a), and FIG. 2(c) shows potential distribution of FIG. 2(a).

In solid electrolyte 1, only either positive ions or negative ions move within a solid, and the other ions form a crystal lattice and do not move. For example, in a case where solid electrolyte 1 is formed of a positive ion conductive compound containing positive ions such as Li ions, when a voltage is applied between positive electrode 2a and negative electrode 2b, the positive ions move within solid electrolyte 1, whereas negative ions do not easily move from the crystal lattice. Therefore, by forming solid electrolyte 1 as a thin layer, an electric double layer is less likely to be formed at an interface between solid electrolyte 1 and positive electrode 2a or negative electrode 2b, and the electric field applied region reaches the inside of solid electrolyte 1. Specifically, when solid electrolyte 1 is formed as a thin layer, an electric field is not shielded in a region in the vicinity of each of positive electrode 2a and negative electrode 2b, and the electric field penetrates into the inside of solid electrolyte 1 and the electric field applied region is increased, forming a single capacitor C as shown in FIG. 2(b).

In this case, as shown in FIG. 2(c), potential distribution in the solid ion capacitor is reduced substantially linearly from positive electrode 2a to negative electrode 2b, and no flat portion is formed or a flat portion only having an extremely short distance is formed within solid electrolyte 1.

Thus, in the solid ion capacitor, the electric field applied region can be increased by reducing the thickness of solid electrolyte 1, and single capacitor C can be formed between positive electrode 2a and negative electrode 2b with solid electrolyte 1 being sandwiched therebetween. Further, since the increase in the electric field applied region increases polarization formed by the ions displaced by the electric field, charges stored in positive electrode 2a and negative electrode 2b are increased, and thereby the electrostatic capacitance per volume can be substantially increased.

The thickness of such solid electrolyte 1 is not particularly limited as long as solid electrolyte 1 is a thin film body that allows the electric field to penetrate into the inside of solid electrolyte 1 when the electric field is applied thereto, and to ensure a sufficient electric field applied region. Preferably, solid electrolyte 1 is formed to have a thickness of less than or equal to 200 µm.

Further, the material for forming solid electrolyte 1 is not particularly limited as long as the material contains an ion conductive compound whose ions move within solid electrolyte 1. Preferably, the material contains a NASICON-type crystal structure in which regular octahedron structures and regular tetrahedron structures are three-dimensionally aligned so that vertices thereof are shared between the two. The NASICON-type crystal structure has a large cavity in the crystal structure, and positive ions move easily, whereas it is extremely difficult for negative ions to move. Moreover, of such ion conductive compounds, a mixed phase of the NASICON-type crystal structure and $AlPO_4$ (berlinite) is more preferable. As the ion conductive element, Li can be preferably used, and as other components contained in the ion conductive compound, components in the form of composite oxides containing Al, P, Ti, Ge, and the like can be preferably used.

Furthermore, as the ion conductive compound, it is also preferable to use a glass ceramic containing a glass component such as $SiO_2$. Generally, a ceramic containing Li has moisture absorption characteristics, and is unstable to moisture. However, by containing a glass component therein, the ceramic can exhibit good stability to moisture, and can improve moisture absorption resistance.

Furthermore, in the present embodiment, a solid ion capacitor having good cycle characteristics in which a reduction in electrostatic capacitance is suppressed even when it is repeatedly charged and discharged is obtained by containing the specific element-containing substance of less than 50 vol % (not including 0 vol %) in positive electrode 2a and negative electrode 2b.

Specifically, as described herein above, merely by forming the solid electrolyte as a thin film, electrostatic capacitance is significantly reduced when charging and discharging are repeated, and thus it is not possible to ensure good cycle characteristics.

This is considered to be because an ion conductive element contained in solid electrolyte 1 generates an impurity as it moves to the electrode (positive electrode 2a or negative electrode 2b) or the interface between the electrode and solid electrolyte 1, accompanied by an irreversible reaction, during charging and discharging, and as a result, electrostatic capacitance is reduced when charging and discharging are repeated, causing deterioration of cycle characteristics.

Therefore, in the present embodiment, by containing the specific element-containing substance in positive electrode 2a and negative electrode 2b, the ion conductive element in positive electrode 2a and negative electrode 2b suppresses causing of an unintended chemical reaction at the interface with solid electrolyte 1, even when the ion conductive element contained in solid electrolyte 1 moves toward positive electrode 2a and negative electrode 2b during charging and discharging. Thereby, a solid ion capacitor having good cycle characteristics in which a reduction in electrostatic capacitance is small even when it is repeatedly charged and discharged can be obtained.

However, when the content of the specific element-containing substance in the electrode is more than or equal to 50 vol %, the specific element-containing substance also disturbs conduction of electrons not accompanied by a chemical reaction contributing to obtaining electrostatic capacitance. Accordingly, it may be difficult to stably obtain a large electrostatic capacitance.

Therefore, in the present embodiment, the content of the specific element-containing substance in the electrodes (positive electrode 2a and negative electrode 2b) is adjusted to be less than 50 vol % (not including 0 vol %), preferably to be 1 to 35 vol %.

Such a specific element-containing substance is not particularly limited as long as it contains an ion conductive element, and generally, a substance containing an element identical to the ion conductive element contained in the ion conductive compound within solid electrolyte 1 is preferably used. For example, when the ion conductive element contained in the ion conductive compound within solid electrolyte 1 is Li, Li or a Li compound containing Li is preferably used.

Although the electrode material used for positive electrode 2a and negative electrode 2b is not particularly limited, a non-valve function material which does not have a valve function, for example, a noble metal material such as Au, Pt, or Pd, or a transition metal material such as Ni, Cu, Cr, Mn, Fe, or Co can be preferably used. An oxide material or a semiconductor material such as SiC can also be used.

However, valve function metals which have a valve function, such as Al, Ti, Ta, Nb, or alloys containing these metals, are not preferable, because they may easily form an insulating layer at the interface between positive electrode 2a or negative electrode 2b and solid electrolyte 1 during fabrication of the solid ion capacitor, and may cause a reduction in electrostatic capacitance.

Further, it is also preferable to roughen the interface between solid electrolyte 1 and positive electrode 2a or negative electrode 2b to have a fine uneven structure. Thereby, the electrode area of positive electrode 2a or negative electrode 2b is increased, and thus the electrostatic capacitance can be further increased, along with formation of solid electrolyte 1 as a thin layer.

It is to be noted that, since solid electrolyte 1 is a sintered body formed by baking treatment as described later, its surface has a certain degree of uneven structure at the sintered stage. Therefore, the interface can be easily formed to have a fine uneven structure, by polishing the surface of the sintered body to have fine unevenness and thereafter forming positive electrode 2a or negative electrode 2b, or by forming positive electrode 2a or negative electrode 2b without polishing the sintered body. The fine uneven structure can also be obtained by performing etching or the like as appropriate on the both main surfaces of solid electrolyte 1.

Next, a method for manufacturing the solid ion capacitor described above will be described.

First, raw materials are weighed in predetermined amounts and mixed. For example, when an ion conductive compound to be fabricated is a mixed phase of $AlPO_4$ and a NASICON-type crystal phase containing Li, Ti, P, and O, a Li compound such as $Li_2CO_3$, a P compound such as $AlPO_4$ or $H_3PO_4$, and a Ti compound such as $TiO_2$ are prepared as raw materials, and these raw materials are weighed in predetermined amounts and mixed to obtain a mixture.

Next, the mixture is heat-treated based on a predetermined heat treatment profile to fabricate an ion conductive compound.

It is to be noted that, when a glass component is contained in the ion conductive compound, it is preferable to fabricate the ion conductive compound by weighing a glass material containing a Si compound such as $SiO_2$ in a predetermined amount, mixing the glass material with the raw materials, heating and melting the mixture, then quenching and vitrifying the mixture, and thereafter heat-treating the mixture based on the predetermined heat treatment profile.

Next, the ion conductive compound is pulverized in a wet manner, then a binder, a solvent, a plasticizer, and the like are added thereto and fully mixed in a wet manner, to obtain slurry. The slurry is dried and granulated, and thereafter press-molded in the shape of pellets or the like, to obtain thin film molded bodies.

Here, the binder, the solvent, the plasticizer, and the like are not particularly limited. For example, a polyvinyl butyral resin or the like can be used as the binder, acetic acid n-butyl or the like can be used as the solvent, and dibutyl phthalate or the like can be used as the plasticizer.

Thereafter, the molded bodies are each baked, for example, by setting the baking temperature to 400° C. to 1250° C. and the baking time to 3 to 70 hours, to fabricate solid electrolyte 1 as a thin film body (for example, with a thickness of less than or equal to 200 µm).

Next, an electrode paste is fabricated. Specifically, a specific element-containing substance containing an ion conductive element, for example, a specific element-containing substance such as Li or a Li compound is prepared. Further, as a conductive powder, preferably, an non-valve function material which does not have a valve function, for example, a noble metal material such as Au, Pt, or Pd, a transition metal material such as Ni, Cu, Cr, Mn, Fe, or Co, an oxide material, or a semiconductor material such as SiC, is prepared.

The conductive powder and the specific element-containing substance are weighed such that the total amount of the conductive powder and the specific element-containing substance, that is, the volume content of the specific element-containing substance in a solid content, is less than 50 vol % (not including 0 vol %), preferably 1 to 35 vol %. Then, a varnish and other additives are added to the weighed substances, and the weighed substances are kneaded in an organic vehicle using a three-roll mill or the like, to obtain a paste. Thereby, the electrode paste is fabricated.

Next, the electrode paste is applied to the both main surfaces of solid electrolyte 1, and then baked at a predetermined temperature to fabricate positive electrode 2a and negative electrode 2b. Thereby, the solid ion capacitor is fabricated.

As described above, in the present embodiment, since the specific element-containing substance is contained in each of positive electrode 2a and negative electrode 2b in the range of less than 50 vol % (not including 0 vol %), the ion conductive element in positive electrode 2a and negative electrode 2b suppresses causing of an unintended chemical reaction at the interface with solid electrolyte 1, even when the ion conductive element in the ion conductive compound moves toward the electrodes during charging and discharging. Thereby, a solid ion capacitor having good cycle characteristics in which a reduction in electrostatic capacitance is small even when it is repeatedly charged and discharged can be obtained.

It is to be noted that the present invention is not limited to the embodiment described above, and can be modified in a range not departing from the gist thereof. Although the embodiment described above has illustrated a solid ion capacitor in the shape of a single plate, it is also preferable to form the solid ion capacitor as a laminated structure similar to a laminated ceramic capacitor. Specifically, the laminated structure similar to a laminated ceramic capacitor can be obtained by laminating a plurality of capacitor element bodies, each including a solid electrolyte, a positive electrode, and a negative electrode such that the positive electrode is formed on one main surface and the negative electrode is formed on the other main surface of the solid electrolyte made of a thin film body, to form a capacitor main body portion, and forming external electrodes at both end portions of the capacitor main body portion. Thus, a solid ion capacitor which is small-sized and has a larger electrostatic capacitance can be easily implemented.

Next, an example of the present invention will be specifically described.

EXAMPLE

[Fabrication of Samples]
[Fabrication of Electrode Pastes]

Pt powder, Pd powder, and Cu powder were prepared as conductive powders, and $Li_2O$ powder was prepared as a specific element-containing substance.

Next, each conductive powder and the $Li_2O$ powder were weighed such that the volume content of the $Li_2O$ powder relative to the total of each conductive powder and the $Li_2O$ powder was 0 vol %, 1 vol %, 3 vol %, 10 vol %, 20 vol %, 35 vol %, and 50 vol %. Then, a varnish was added to these weighed powders, and the substances were kneaded in an organic vehicle using a three-roll mill to obtain a paste. Thereby, seven kinds of Pt pastes, Pd pastes, and Cu pastes having different volume contents of the $Li_2O$ powder were fabricated.

[Fabrication of Solid Ion Capacitor]

$H_3PO_4$, $Li_2CO_3$, $Al(PO_3)_3$, $SiO_2$, and $TiO_2$ were prepared as raw materials, and these raw materials were weighed in predetermined amounts and mixed to obtain a mixture.

Next, the mixture was introduced into a melting kiln, and heated at a temperature of 1500° C. for three hours to be melted. The melted mixture was caused to flow out into a molding die through a slit-shaped hole provided in the bottom of the melting kiln at a temperature of 300° C., and was quenched to obtain a vitrified molded body.

Next, the vitrified molded body was heat-treated based on a predetermined heat treatment profile to obtain a Li ion conductive compound. Specifically, the temperature of a heat treatment furnace was increased from room temperature to 600° C. at a temperature increase rate of 300° C./h, and then was increased to 950° C. at a temperature increase rate of 100° C./h. Subsequently, the heat treatment temperature was set to 950° C. and was kept for 10 hours. Thereafter, the temperature was cooled slowly back to the room temperature, to obtain a crystallized Li ion conductive compound.

When the X-ray diffraction spectrum of the Li ion conductive compound was measured using an X-ray diffractometer, it was confirmed that the Li ion conductive compound was a mixed phase of a NASICON-type crystal of $LiTi_2(PO_4)_3$ and an $AlPO_4$ (berlinite)-type crystal.

When the component composition of the Li ion conductive compound was measured using an ICP emission spectroscopy apparatus (ICAP6300 manufactured by Thermo Fischer Scientific), it was confirmed that the composition was $Li_{1.21}Al_{0.64}Ti_{1.53}Si_{0.16}P_{2.82}O_{12}$.

Next, the Li ion conductive compound was pulverized in a wet manner, then a polyvinyl butyral resin as a binder, acetic acid n-butyl as a solvent, and dibutyl phthalate as a plasticizer were added thereto and fully mixed in a wet manner, to obtain slurry. The slurry was dried and granulated, and thereafter press-molded to obtain molded bodies.

Then, the molded bodies were each baked at a baking temperature of 800° C. for 12 hours, to obtain a sintered body. Next, the sintered body was cut using a diamond cutter to have a thickness of 160 μm, and the surface thereof was mirror-finished by mechanical polishing, to obtain a solid electrolyte.

Next, the Pt paste, the Pd paste, or the Cu paste described above was applied to both main surfaces of the solid electrolyte, and baked at a temperature of 600° C. Thereby, a positive electrode and a negative electrode having a thickness of 1 μm were formed, and samples of sample numbers 1 to 21 were obtained. It is to be noted that the positive electrode and the negative electrode each had an electrode surface area of 0.25 $cm^2$.

[Evaluation of Samples]

Charging and discharging were performed on the samples of sample numbers 1 to 21 based on a predetermined charging/discharging profile, using a constant voltage-type charging/discharging characteristics evaluation apparatus.

Figure 3:
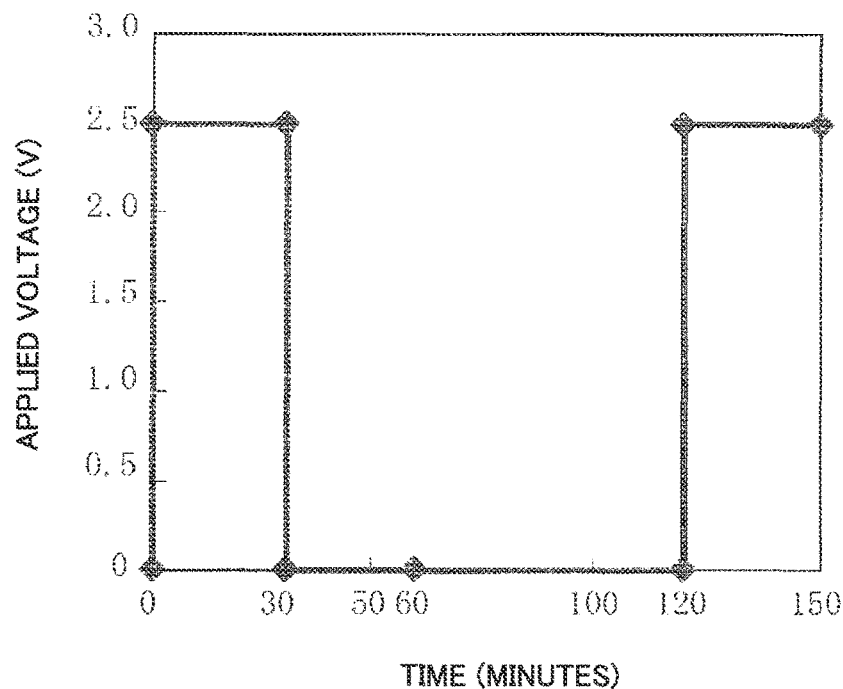
FIG. 3 is a view showing a voltage profile of a charging/discharging cycle in an example.

FIG. 3 is a view showing the charging/discharging profile used in the present example, in which the axis of abscissas represents time (minutes) and the axis of ordinates represents applied voltage (V).

Specifically, charging was performed for 30 minutes by applying a constant voltage of 2.5 V between a positive electrode and a negative electrode, discharging was subsequently performed for 30 minutes, the discharging state was maintained for another 60 minutes by establishing a short circuit between the positive electrode and the negative electrode, and thereafter charging was performed again for 30 minutes by applying a constant voltage of 2.5 V between the positive electrode and the negative electrode. The above charging/discharging cycle was repeated 10 times.

It is to be noted that the short-circuit time was provided to inhibit influence on the measurement of electrostatic capacitance in a next cycle.

Then, the specific capacity in each charging/discharging cycle was calculated from current characteristics during charging/discharging, to evaluate cycle characteristics.

Figure 4:
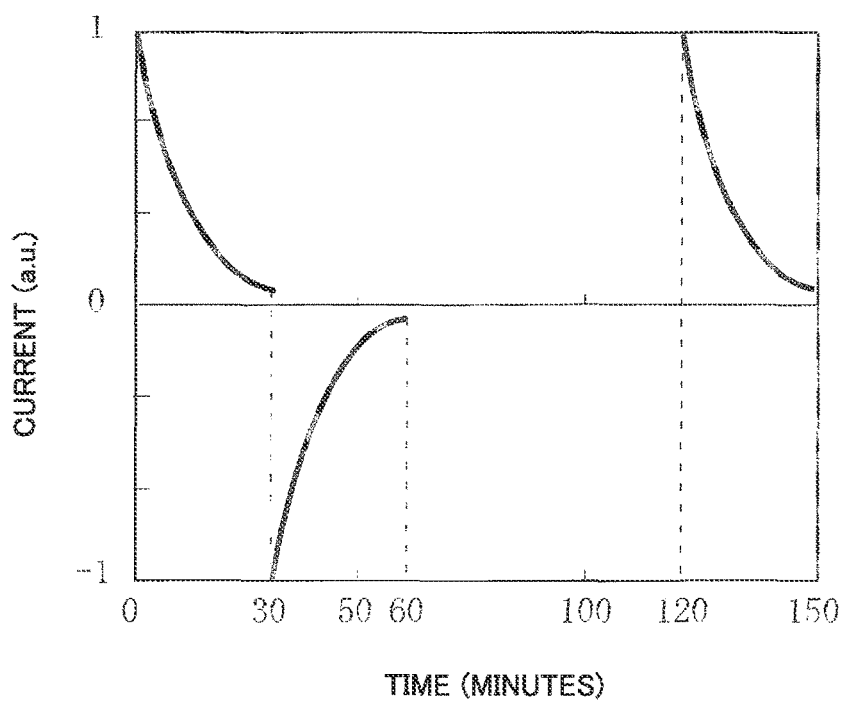
FIG. 4 is a view showing temporal change of a discharging current in the example.

FIG. 4 shows the current characteristics during charging/discharging, in which the axis of abscissas represents time (minutes) and the axis of ordinates represents current (a.u).

The specific capacity was determined by integrating a current value during discharging from the current characteristics by time, converting the integrated value into a charge, calculating an electrostatic capacitance from the amount of the charge, and dividing the electrostatic capacitance by an electrode surface area.

Further, a specific capacity initial ratio ΔC was determined from an initial value C1 of the specific capacity and a specific capacity C10 obtained after 10 cycles, based on an equation (1):

$$\Delta C = (C10/C1) \times 100 \qquad (1).$$

Table 1 shows volume contents of $Li_2O$, initial values C1 of the specific capacity, and specific capacity initial ratio ΔC in sample numbers 1 to 21.

TABLE 1

| Sample No. | Electrode Material | $Li_2O$ Volume Content (vol %) | Initial Value C1 of Specific Capacity (μF/$cm^2$) | Specific Capacity Initial Ratio ΔC (%) |
|---|---|---|---|---|
| 1* | Pt | 0 | 1141 | 74.5 |
| 2 | | 1 | 1184 | 76.3 |
| 3 | | 3 | 1103 | 79.3 |
| 4 | | 10 | 1154 | 82.1 |
| 5 | | 20 | 1081 | 85.1 |
| 6 | | 35 | 1039 | 86.3 |
| 7* | | 50 | 1027 | — |
| 8* | Pd | 0 | 1203 | 78.2 |
| 9 | | 1 | 1254 | 80.9 |
| 10 | | 3 | 1054 | 82.2 |
| 11 | | 10 | 1101 | 85.1 |
| 12 | | 20 | 1150 | 88.2 |
| 13 | | 35 | 1059 | 89.3 |
| 14* | | 50 | 1062 | — |
| 15* | Cu | 0 | 1154 | 78.1 |
| 16 | | 1 | 1132 | 79.7 |
| 17 | | 3 | 1117 | 81.9 |
| 18 | | 10 | 1230 | 84.7 |
| 19 | | 20 | 1234 | 87.6 |
| 20 | | 35 | 1068 | 89.7 |
| 21* | | 50 | 964 | — |

*outside the scope of the present invention

Sample numbers 1 to 7 are samples using the Pt paste.

In any of the samples of sample numbers 1 to 7, the solid electrolyte was a thin film body with a thickness of 160 μm, and thus initial value C1 of the specific capacity was 1027 to 1184 μF/$cm^2$. Accordingly, a large specific capacity more than or equal to 1000 μF/$cm^2$ was able to be obtained.

However, as for sample number 1, specific capacity initial ratio ΔC was 74.5%, and it was found that the specific capacity was reduced significantly when charging and discharging were repeated. This is considered to be because, since $Li_2O$ as the specific element-containing substance was not contained in the electrode, Li contained in the solid electrolyte generated an impurity as it moved to the electrode or the interface between the electrode and the solid electrolyte, accompanied by an irreversible reaction, during charging and discharging, and as a result, electrostatic capacitance was reduced when charging and discharging were repeated.

On the other hand, as for sample number 7, although its electrostatic capacitance was able to be measured in an early stage of the cycles, a stable electrostatic capacitance was not able to be measured after the 10 cycles. This is considered to be because, since the volume content of $Li_2O$ was excessive, $Li_2O$ also disturbed conduction of electrons not accompanied by a chemical reaction contributing to obtaining electrostatic capacitance, and thereby a stable electrostatic capacitance was not able to be measured.

In contrast, as for sample numbers 2 to 6, it was found that, since $Li_2O$ was contained in the positive electrode or the negative electrode in the range of less than or equal to 35 vol %, Li in the positive electrode and the negative electrode suppressed causing of an unintended chemical reaction at the interface with the solid electrolyte, and as a result, specific capacity initial ratio ΔC was larger than that of sample number 1, and a reduction in specific capacity was suppressed even after the 10 cycles.

Sample numbers 8 to 14 are samples using the Pd paste.

In any of the samples of sample numbers 8 to 14, the solid electrolyte was a thin film body with a thickness of 160 μm, and thus initial value C1 of the specific capacity was 1062 to 1254 μF/cm². Accordingly, a large specific capacity more than or equal to 1000 μF/cm² was able to be obtained.

However, as for sample number 8, specific capacity initial ratio ΔC was 78.2%, and it was found that the specific capacity was reduced significantly when charging and discharging were repeated, for the same reason as that for sample number 1.

On the other hand, as for sample number 14, although its electrostatic capacitance was able to be measured in an early stage of the cycles, a stable electrostatic capacitance was not able to be measured after the 10 cycles, for the same reason as that for sample number 7.

In contrast, as for sample numbers 9 to 13, it was found that, since $Li_2O$ was contained in the positive electrode or the negative electrode in the range of less than or equal to 35 vol %, Li in the positive electrode and the negative electrode suppressed causing of an unintended chemical reaction at the interface with the solid electrolyte, and as a result, specific capacity initial ratio ΔC was smaller than that of sample number 8, and a reduction in specific capacity was suppressed even after the 10 cycles.

Sample numbers 15 to 21 are samples using the Cu paste.

In any of the samples of sample numbers 15 to 21, the solid electrolyte was a thin film body with a thickness of 160 μm, and thus initial value C1 of the specific capacity was 964 to 1234 μF/cm². Accordingly, a large specific capacity more than or equal to 950 μF/cm² was able to be obtained.

However, as for sample number 15, specific capacity initial ratio ΔC was 78.1%, and it was found that the specific capacity was reduced significantly when charging and discharging were repeated, for the same reason as that for sample number 1.

On the other hand, as for sample number 21, although its electrostatic capacitance was able to be measured in an early stage of the cycles, a stable electrostatic capacitance was not able to be measured after the 10 cycles, for the same reason as that for sample number 7.

In contrast, as for sample numbers 16 to 20, it was found that, since $Li_2O$ was contained in the positive electrode or the negative electrode in the range of less than or equal to 35 vol %, Li in the positive electrode and the negative electrode suppressed causing of an unintended chemical reaction at the interface with the solid electrolyte, and as a result, specific capacity initial ratio ΔC was larger than that of sample number 15, and a reduction in specific capacity was suppressed even after the 10 cycles.

As described above, in the solid ion capacitor of the present example, it was confirmed that, by containing $Li_2O$ in the electrodes in the range of less than 50 vol %, preferably 1 to 35 vol %, specific capacity initial ratio ΔC is suppressed when compared with a case where $Li_2O$ is not contained, and cycle characteristics are improved.

Figure 5:
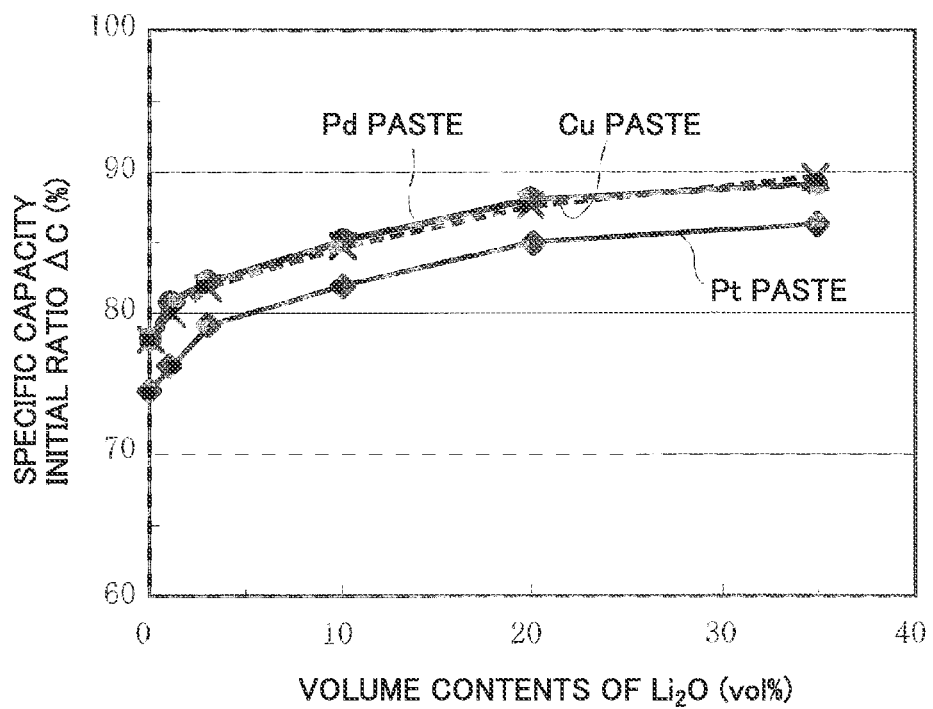
FIG. 5 is a view showing the relation between the volume content of $Li_2O$ and a specific capacity initial ratio $\Delta C$ in the example.

FIG. 5 is a view showing the relation between the volume content of $Li_2O$ in each of the Pt paste, the Pd paste, and the Cu paste, and specific capacity initial ratio ΔC. The axis of abscissas represents the volume content of $Li_2O$ (vol %), and the axis of ordinates represents specific capacity initial ratio ΔC (%). In FIG. 5, the Pt paste is indicated by black rhombuses, the Pd paste is indicated by black circles, and the Cu paste is indicated by marks X.

As is clear from FIG. 5, it was found that, as the volume content of $Li_2O$ was increased in the range of less than or equal to 35 vol %, specific capacity initial ratio ΔC was able to be suppressed more effectively, contributing to the improvement of cycle characteristics.

It is to be noted that the example described above is merely an example which embodies the present invention, and the present invention is not limited to this example. For example, concerning the type of element contained in the solid electrolyte, the same function and effect can also be obtained, for example, by containing an element such as Ge in addition to or instead of Ti.

A solid ion capacitor having a large electrostatic capacitance and good cycle characteristics can be implemented.

REFERENCE SIGNS LIST

1: solid electrolyte; 2a: positive electrode; 2b: negative electrode.

The invention claimed is:

1. A solid ion capacitor comprising:
a solid electrolyte that contains an ion conductive compound, the ion conductive compound containing Li, and a mixed phase of a NASICON-type crystal and a berlinite-type crystal; and
respective electrodes on opposed surfaces of the solid electrolyte, wherein said electrodes contain a substance containing Li, and a volume content of said substance containing Li is less than 50 vol % and more than 0 vol %.

2. The solid ion capacitor according to claim 1, wherein said volume content is 1 to 35 vol %.

3. The solid ion capacitor according to claim 1, wherein said ion conductive compound contains a glass component.

4. The solid ion capacitor according to claim 1, wherein said respective electrodes comprise a non-valve function material which does not have a valve function.

5. The solid ion capacitor according to claim 4, wherein said non-valve function material is selected from the group consisting of a noble metal material, a transition metal material, an oxide material, a semiconductor material, and combination thereof.

6. The solid ion capacitor according to claim 5, wherein said non-valve function material includes at least one selected from Pd, Pt, and Cu.

7. The solid ion capacitor according to claim 1, wherein said solid electrolyte has a thickness of less than or equal to 200 μm.

* * * * *